United States Patent
Mohammad et al.

(10) Patent No.: US 11,718,688 B2
(45) Date of Patent: Aug. 8, 2023

(54) HYDROXYETHYL CELLULOSE DERIVED FROM BIOMASS AND USE OF HYDROXYETHYL CELLULOSE IN BRINE TREATMENT

(71) Applicant: UNITED ARAB EMIRATES UNIVERSITY, Al Ain (AE)

(72) Inventors: Ameera Fares Mohammad, Al Ain (AE); Ali H. Al-Marzouqi, Al Ain (AE); Emmanuel Galiwango, Al Ain (AE); Essa Georges Lwisa, Al Ain (AE); Jawad Mustafa, Al Ain (AE)

(73) Assignee: UNITED ARAB EMIRATES UNIVERSITY, Al Ain (AE)

( * ) Notice: Subject to any disclaimer, the term of this patent is extended or adjusted under 35 U.S.C. 154(b) by 0 days.

(21) Appl. No.: 16/997,533

(22) Filed: Aug. 19, 2020

(65) Prior Publication Data
US 2022/0056156 A1 Feb. 24, 2022

(51) Int. Cl.
*C08B 11/02* (2006.01)
*C09K 8/588* (2006.01)

(52) U.S. Cl.
CPC .............. *C08B 11/02* (2013.01); *C09K 8/588* (2013.01)

(58) Field of Classification Search
CPC ......... C08B 11/00; C08B 11/02; C08B 11/04; C08B 11/08
See application file for complete search history.

(56) References Cited

U.S. PATENT DOCUMENTS

| | | | |
|---|---|---|---|
| 2,112,116 A * | 3/1938 | Richter | C08B 1/00 536/37 |
| 6,348,436 B1 * | 2/2002 | Langlois | B82Y 5/00 507/112 |
| 10,501,761 B2 | 12/2019 | Medoff et al. | |
| 2018/0187065 A1 | 7/2018 | Mirzaei et al. | |
| 2018/0362839 A1 | 12/2018 | Biyani et al. | |

FOREIGN PATENT DOCUMENTS

| | | |
|---|---|---|
| CN | 107973881 A | 5/2018 |
| JP | 2018000177 A | 1/2018 |

OTHER PUBLICATIONS

Homogenous Synthesis of Hydroxyethylcellulose in NaOH/Urea Aqueous Solution, Zhou, et al., Macromolecular Bioscience, 2006, 6, 84-89 (Year: 2006).*

(Continued)

*Primary Examiner* — Aiqun Li
(74) *Attorney, Agent, or Firm* — Nath, Goldberg & Meyer; Richard C. Litman

(57) ABSTRACT

The hydroxyethyl cellulose derived from biomass is made by preparing a biomass by extracting resins and waxes, acid leaching, and alkali treatment to obtain a cellulose-rich residue, and then bleaching the cellulose-rich residue, followed by hydroxyethylation of the cellulose to obtain hydroxyethyl cellulose. The use of hydroxyethyl cellulose in brine treatment include reacting concentrated brine and hydroxyethyl cellulose with an effluent gas stream to capture $CO_2$ and reduce salinity of the concentrated brine. The reduced salinity brine may then be useful for enhanced oil recovery methods.

4 Claims, 4 Drawing Sheets

(56) References Cited

OTHER PUBLICATIONS

Isolation, preparation, and characterization of nanofibers from oil palm empty-fruit-bunch (OPEFB), Fahma, et al., Cellulose, 2010 17:977-985 (Year: 2010).*

Lavanya et al., "Sources of Cellulose and their Applications—a Review," International Journal of Drag Formulation and Research, vol. 2, Issue 6, Nov.-Dec. 2011.

Sheltami et al., "Extraction of cellulose nanocrystals from mengkuang leaves (Pandanus tectorius)," Carbohydrate Polymers, 88(2), Apr. 2, 2012, pp. 772-779.

Ching et al., "Effect of preparation conditions on cellulase from oil palm empty fruit bunch fiber," Bioresources, 9(4), 2014, pp. 6373-6385.

Abdel-Halim, "Chemical modification of cellulose extracted from sugarcane bagasse: Preparation of hydroxyethyl cellulose," Arabian Journal of Chemistry, vol. 7, Issue 3, Jul. 2014, pp. 362-371.

* cited by examiner

HYDROXYETHYL CELLULOSE DERIVED FROM BIOMASS AND USE OF HYDROXYETHYL CELLULOSE IN BRINE TREATMENT

BACKGROUND

1. Field

The disclosure of the present patent application relates to hydroxyethyl cellulose, and particularly to hydroxyethyl cellulose derived from biomass and use of hydroxyethyl cellulose in brine treatment.

2. Description of the Related Art

Cellulose is the most abundant natural polymer on earth. Therefore, its proper utilization can lead to sustainable green growth. Cellulose is the main constituent of plant cell walls, providing structural support and acting as a reinforcing element, together with hemicellulose and lignin. Cellulose utilization in industry is steadily increasing because of its abundance, low cost, potential application as a feed stock, and presence in numerous organisms, including fungi, algae, and bacteria. In addition, cellulose has the advantage of being biodegradable, durable, non-toxic, thermally and mechanically stable, and is used as a starting material for many industrial processes (e.g. carbon dioxide capture, enhanced oil recovery, etc.). Cellulose derived from plants has been used for a wide range of applications, including brine desalination.

Date palm cultivation is on the rise, and its population, particularly in the gulf region, has increased over recent years. In the UAE alone, the population of date palm trees stands at about 40 million trees. These palm trees generate huge amounts of biowaste. Currently, much of this waste is turned into compost, used for traditional arts and crafts, or burned, polluting the environment. In a study of the Klason lignin extraction method, it was determined that date palm lignocellulosic waste in fibers alone consist of cellulose (34%), hemicellulose (17%) and lignin (21%).

Thus, date palm biomass waste is rich in cellulose and has the potential to contribute to sustainable future development of biorefineries. The date palm tree, *Phoenix dactylifera* L., is considered one of the oldest tree species. To date, it has played a vital social, environmental, and economical role throughout the world, and especially in the Middle East and North Africa. The date palm tree has been particularly important in such countries as Saudi Arabia, Egypt, U A E, and Algeria, where this plant has been an integral part of the society. However, managing date palm biomass waste remains a challenge. Thus, methods of utilizing date palm biomass waste are desired.

Brine desalination is gaining increasing importance, as population growth and associated water demand exceed conventional accessible water resources. The shortage of water supplies for drinking and irrigation purposes is already a serious problem, and severe water shortages may occur in many countries by 2020. Within the Middle East, the United Arab Emirates is suffering from water shortage due to the fast-growing population and the expansion of industrial and agricultural activities. Desalination has become an important source of drinking water production. Thermal desalination and membrane methods have been developed and used over the past decades.

The Middle East is considered to be the leader in large-scale seawater desalination. The Gulf Cooperation Council (GCC) countries produce over 60% of desalinated water worldwide. The UAE alone produces about 13% of the world's production due to its economic and demographic development. Although technological advances have resulted in the development of new and highly efficient desalination processes, few improvements have been seen in the management and handling of the major byproduct waste of most desalination plants, namely, reject brine. Desalination plants often try to find cost-effective and practical methods for reject brine disposal, while at the same time trying to comply with environmental regulations. Regulatory authorities usually do not allow direct disposal of reject brine if the concentrations of contaminants, primarily metals, exceed concentration-based discharge limits. Thus, the disposal or management of desalination reject brine (concentrate) represents major environmental challenges to most plants, and it is becoming more expensive. This is especially true for inland desalination plants, where reject brine disposal could reach 15% of the overall desalination cost.

In the desalination process, two streams are produced, a product water stream with high purity, and a brine or concentrate stream with high salt concentration. Management of reject brine from desalination plants poses serious environmental and economic challenges. Brine disposal methods should be considered after proper feed water pre-treatment, proper desalination process, and maximizing system recovery to minimize the brine stream, and hence reduce the cost of subsequent disposal. Some of the conventional options for brine disposal from inland desalination plants are disposal to surface water bodies and sewer systems, disposal to evaporation ponds, deep well injection and land applications of brine. In spite of their high evaporation efficiency due to high temperatures, evaporation ponds suffer from many drawbacks including the need for huge areas and the possibility of contaminant leakage into soil and groundwater.

There is an urgent need to develop a new process for the management of reject brine that can be used by desalination plants, since reject brine has not been utilized and the environmental effects associated with brine disposal have not been sufficiently considered. The chemical reaction of reject brine with carbon dioxide is believed to be a new, effective, economical, and environmentally friendly approach. Chemical reactions are carried out based on the Solvay process to convert the reject brine into a useful and reusable solid product (sodium bicarbonate). At the same time, the treated water can be used for irrigation and other industrial applications. Another application of this process is capturing $CO_2$ gas from the industrial exhaust or flue gases. In the Solvay process, the concentrated brine solution is reacted with ammonia and carbon dioxide to form soluble ammonium chloride and a precipitate of sodium bicarbonate. The ammonium chloride solution is mixed with calcium hydroxide and heated to recover ammonia, which is not involved in the overall reaction of the Solvay process, but which plays an important role in the intermediate reactions, buffers the solution at a basic pH, and increases the precipitation of sodium bicarbonate from the first reaction. A new process for the capture of $CO_2$ and the reduction of water salinity has been proposed by El-Naas, et al., U.S. Patent Publication 2017/0050871, published Feb. 23, 2017. The proposed modification of the Solvay process does not involve the use of ammonia. Instead, calcium oxide is added directly to the reactor, which converts to calcium hydroxide as soon as it contacts the brine, raises the pH and captures $CO_2$ by reacting with sodium chloride. However, low sodium removal and high solubility of the intermediate product are some of the main challenges facing the new modified Solvay process. The existing Solvay process utilizes an environmentally unfriendly chemical (ammonia) to achieve 90% $CO_2$ removal.

$CO_2$ is the major contributor to and one of the main reasons for global warming, as it stays longer in the atmosphere than other gases. Carbon dioxide is produced naturally, and then it is consumed through the carbon cycle. The high consumption of coal and fossil fuels releases high amounts of carbon into the atmosphere. In the past, coal-based power plants operated by oil and natural gas have contributed about 60% of the total $CO_2$ emissions in the atmosphere. Thus, removal of $CO_2$ from flue gases can effectively reduce the amount of carbon into the atmosphere. Nowadays, there is a desire in the industrial sectors to adapt technologies that can effectively reduce carbon emissions. Carbon storage, capture, and utilization are prominent methods to sequestrate $CO_2$ and also to produce different valuable chemicals.

The goal of enhanced oil recovery (EOR) is to utilize different techniques to improve the extraction of gas and oil from the resources that already exist. Common techniques specifically designed to achieve EOR include steam flooding, water flooding and gas injection. In steam flooding, steam transfers heat to the oil that results in decrease of its viscosity making it easy for oil to flow. In water flooding, water is injected into wells that push the oil out from the wells. Natural gas, nitrogen, and carbon dioxide are commonly used gases for EOR. These gases can either dissolve into the oil and decrease its viscosity or exert pressure into an oil reservoir that results in the movement of oil out from the well. Normally, to increase the mobility of oil, a complex mixture of polymers, alkaline bases and surfactants is injected into an oil well, which is commonly termed as chemical flooding. The surfactants decrease the interfacial tension that exists between oil and the flooding solution, which ultimately increases oil mobility. In an ideal case, the interfacial tension should be reduced to such an extent that the emulsion is stable and homogenous enough so that different components do not separate from each other while flowing. The emulsion depends on the concentration and nature of surfactant, salt content, and temperature of water present in the reservoir.

Nowadays, enhanced oil recovery techniques are one of the top priorities of technology development in petroleum industries due to the increase in demand for oil and gas, which cannot be satisfied by primary production or secondary production methods. The main function of an EOR process is to displace oil to the production wells by the injection of different fluids to supplement the natural energy present in the reservoir. Moreover, these injection fluids can also help in the alterations of the properties of the reservoir, such as lowering the interfacial tension (IFT) between crude oil and water, wettability alteration, a change in pH value, emulsion formation, clay migration and oil viscosity reduction.

In chemical flooding, emulsions are not stable enough to withstand high pressure, and separation of different components takes place that reduces oil mobility. Moreover, chemical flooding can pose a serious threat to environmental safety. Steam and gas flooding require high energy that makes the whole process not feasible enough to be employed for long term usage. Treated brine with low salinity, which is obtained after the treatment of reject brine, is considered as one of the attractive alternatives for engineers to achieve high recovery of oil, especially in those areas where desalination plants are widely utilized to remove salt content from water, as in the United Arab Emirates. The main shortcoming of this process is its high interfacial tension, which impacts negatively on the upward movement of oil from reservoirs. Surface tension is one of the most important properties to identify the usefulness of treated brine. A low surface tension is required to achieve high oil recovery, as it increases the mobility ratio and oil sweep efficiency. In addition, low saline water having a low surface tension can also be utilized in single wells, as compared to the whole reservoir.

Thus, hydroxyethyl cellulose derived from biomass and use of hydroxyethyl cellulose in brine treatment solving the aforementioned problems are desired.

SUMMARY

The hydroxyethyl cellulose derived from biomass and use of hydroxyethyl cellulose in brine treatment may include preparing a biomass by extracting resins and waxes, acid leaching, and alkali treatment of biomass to obtain a cellulose-rich residue, and then bleaching the cellulose-rich residue, followed by hydroxyethylation of the cellulose to obtain hydroxyethyl cellulose. The biomass may be extracted by Soxhlet extraction with benzene/ethanol (2:1) to produce extractive free biomass. The extractive free biomass may then be acid leached by heating and stirring the extractive free biomass in the presence of hydrochloric acid to obtain a cellulose/lignin-rich residue. The cellulose/lignin-rich residue may then undergo alkali treatment by stirring and heating the cellulose/lignin-rich residue in the presence of sodium hydroxide to produce a cellulose-rich residue. The cellulose-rich residue may be bleached by treating dried cellulose-rich residue with acetic acid, hydrogen peroxide, and sulfuric acid to obtain bleached cellulose. The bleached cellulose may then undergo hydroxyethylation by reacting the bleached cellulose with sodium hydroxide and urea in aqueous solution under mild conditions.

The source of the biomass is plant waste. Preferably, the source of the biomass is date palm waste biomass (*Phoenix dactylifera* L.).

Methods are provided to use hydroxyethyl cellulose to treat concentrated brine, such as the concentrated brine produced during desalination. This treatment may include injecting effluent gas (containing between 0.15% and 10% $CO_2$) into a bubble column reactor containing a mixture of hydroxyethyl cellulose (preferably, the hydroxyethyl cellulose produced as described above) and concentrated brine. The molar ratio of the hydroxyethyl cellulose and the concentrated brine may be determined according to the Solvay process. The reaction mixture may be adjusted to a pH above 11.0 in order to increase the rate of the $CO_2$ dissociation reaction and reduce the sodium concentration by up to 32%. The resulting treated brine sample may have a low interfacial tension value.

The use of hydroxyethyl cellulose in brine treatment may include mixing hydroxyethyl cellulose with waste brine to form an aqueous feed stream. The aqueous feed stream may include between 1 wt. % and 5 wt. % hydroxyethyl cellulose. The starting concentration of sodium chloride in the aqueous feed stream may be between 50.0 g/L and 75.0 g/L. The method further includes passing a gas stream through the aqueous feed in a bubble column reactor. The gas stream may include (by volume) between 0.03% $CO_2$ and 10% $CO_2$, between 0.03% $CO_2$ and 0.15% $CO_2$, between 0.15% $CO_2$ and 3% $CO_2$, or between 3% $CO_2$ and 10% $CO_2$. This method may result in reducing the sodium chloride in the aqueous feed to below 50.0 g/L. The method may further result in reducing the carbon dioxide in the gas stream by between 80% and 95%. The method may further result in reducing the pH of the aqueous feed stream from a starting pH of 11.5 to between pH 8 and pH 9.5.

The feed gas used to treat brine may include flue gas, flare gas, exhaust gas, natural gas, or the like.

The brine samples treated with hydroxyethyl cellulose may be used in enhanced oil recovery operations.

These and other features of the present subject matter will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figures 1A, 1B:
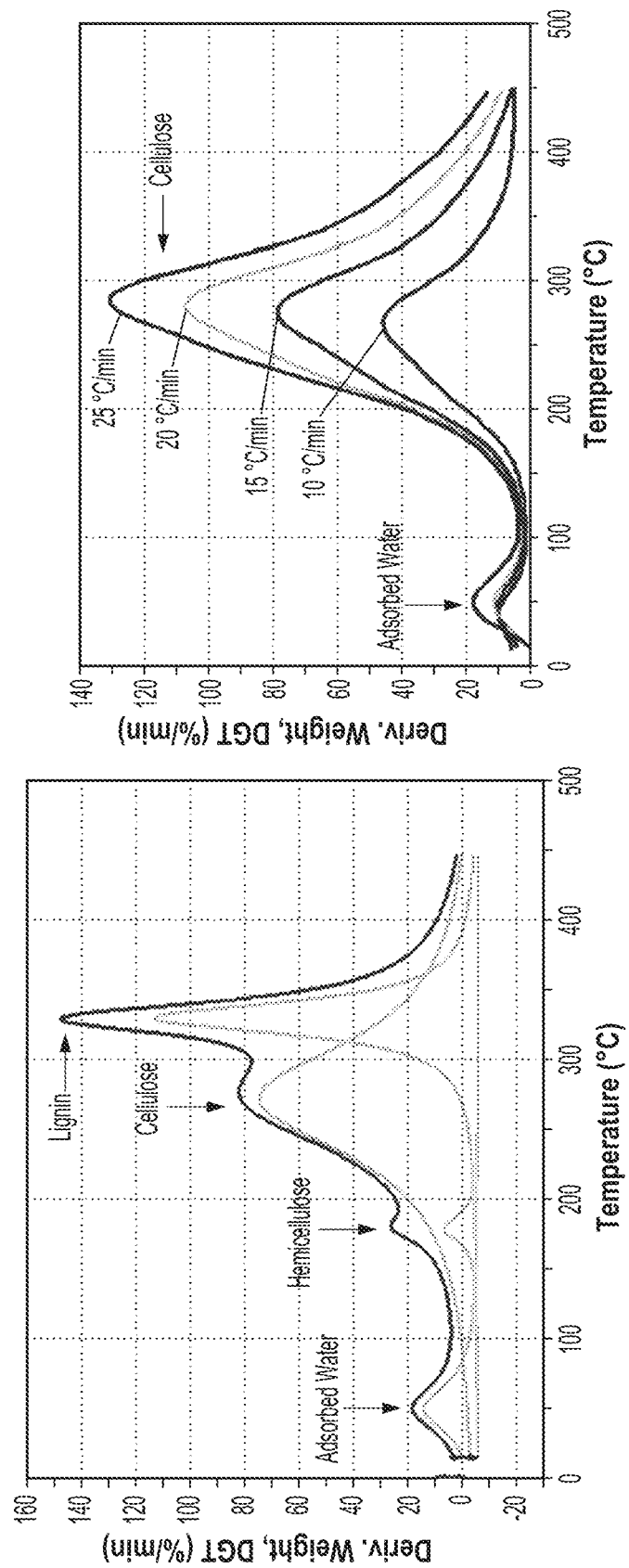
FIG. 1A is a plot of the first derivative (DTG curve) of the thermogravimetric analysis (TGA curve) of lignocellulose fractions in date palm waste biomass.
FIG. 1B is a plot of the first derivative (DTG curve) of the thermogravimetric analysis (TGA curve) of cellulose fractions isolated from date palm waste biomass.
Figures 2A, 2B:
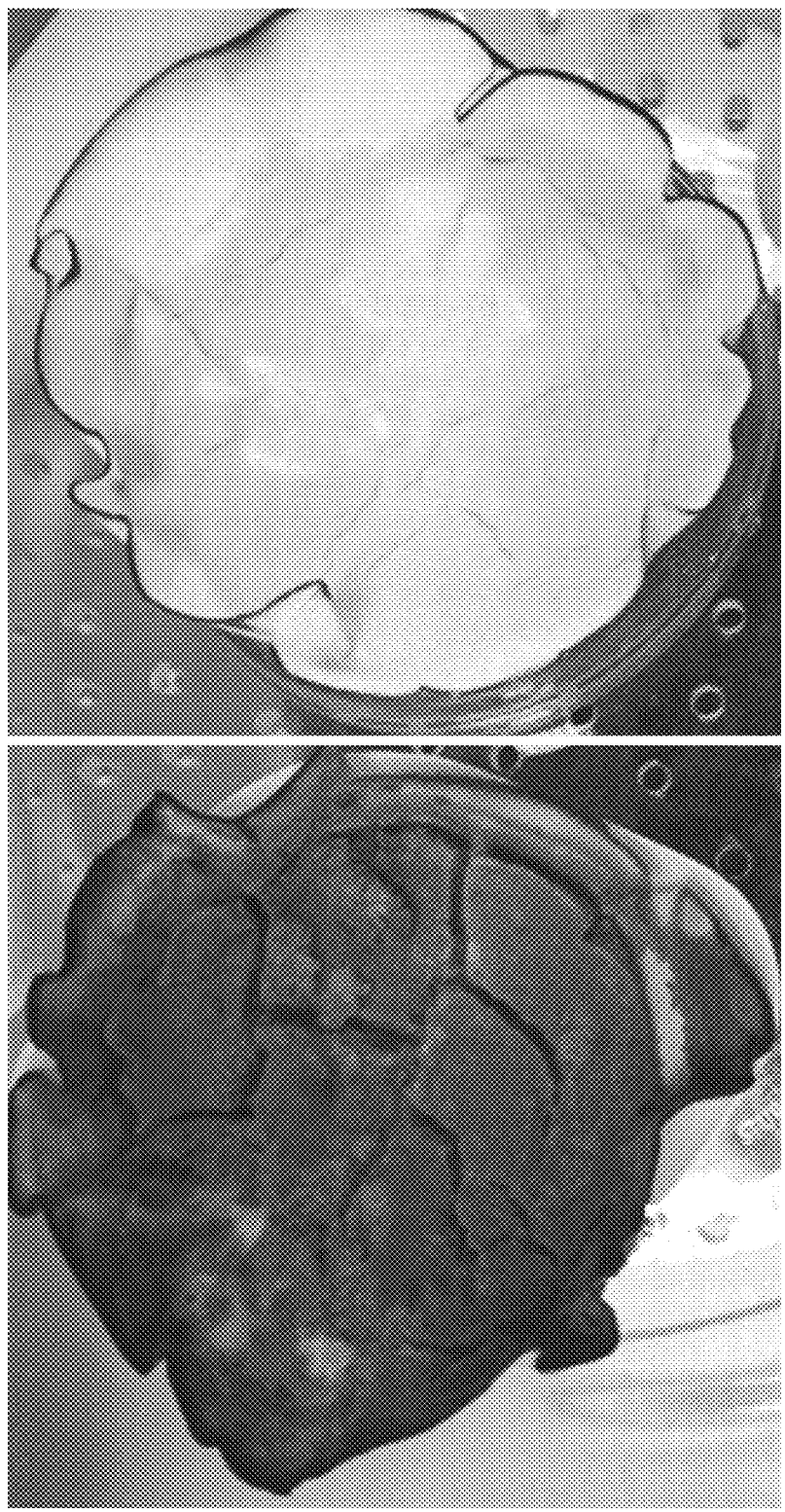
FIG. 2A is a photograph of cellulose prepared from date palm waste biomass before bleaching.
FIG. 2B is a photograph of cellulose prepared from date palm waste biomass after bleaching.

The hydroxyethyl cellulose derived from biomass and use of hydroxyethyl cellulose in brine treatment may include preparing a biomass by extracting resins and waxes, acid leaching, and alkali treatment to obtain a cellulose-rich residue, and then bleaching the cellulose-rich residue, followed by hydroxyethylation of the cellulose to obtain hydroxyethyl cellulose. The biomass may be extracted by Soxhlet extraction with benzene/ethanol (2:1) to produce extractive-free biomass. The extractive-free biomass may then be acid leached by heating and stirring the extractive-free biomass in the presence of hydrochloric acid to obtain a cellulose/lignin-rich residue. The cellulose/lignin-rich residue may then undergo alkali treatment by stirring and heating the cellulose/lignin-rich residue in the presence of sodium hydroxide to produce a cellulose-rich residue. The cellulose-rich residue may be bleached by treating dried cellulose-rich residue with acetic acid, hydrogen peroxide, and sulfuric acid to obtain bleached cellulose. The bleached cellulose may then undergo hydroxyethylation by reacting the bleached cellulose with sodium hydroxide and urea in aqueous solution under mild conditions.

The source of the biomass may be plant waste. Preferably, the source of the biomass is date palm waste biomass (*Phoenix dactylifera* L.).

Methods are provided to use hydroxyethyl cellulose to treat concentrated brine, such as the concentrated brine produced during desalination. This treatment may include injecting effluent gas (10% $CO_2$ and 90% air) into a bubble column reactor containing a mixture of hydroxyethyl cellulose and concentrated brine. The reaction mixture may be adjusted to a pH above 11.0, in order to increase the rate of the $CO_2$ dissociation reaction and reduce the sodium concentration by up to 32%. The resulting treated brine sample has a low interfacial tension value.

The use of hydroxyethyl cellulose in brine treatment may include mixing hydroxyethyl cellulose with waste brine to form an aqueous feed stream. The aqueous feed stream may include between 1 wt. % and 5 wt. % hydroxyethyl cellulose. The starting concentration of sodium chloride in the aqueous feed stream may be between 50.0 g/L and 75.0 g/L. The method further includes passing a gas stream through the aqueous feed in a bubble column reactor. The gas stream may include (by volume) between 0.03% $CO_2$ and 10% $CO_2$, between 0.03% $CO_2$ and 0.15% $CO_2$, between 0.15% $CO_2$ and 3% $CO_2$, or between 3% $CO_2$ and 10% $CO_2$. The method may result in reducing the sodium chloride in the aqueous feed to below 50.0 g/L. The method may further result in reducing the carbon dioxide in the gas stream by between 80% and 95%. The method may further result in reducing the pH of the aqueous feed stream from a starting pH of 11.5 to between pH 8 and pH 9.5.

The brine samples treated with hydroxyethyl cellulose may be used in enhanced oil recovery operations.

Hydroxyethyl cellulose is a commercially important polymer derived from cellulose and having the structural formula:

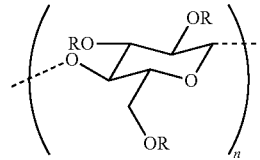

where R is H or $CH_2CH_2OH$. Hydroxyethyl cellulose is a gelling and thickening agent used in cosmetics, cleaning solutions, household products, drug delivery (particularly for hydrophilization), and lubricants. It is also used extensively in the oil and gas industry as a drilling mud additive under the name HEC, and in various industrial applications, such as paint and coatings, ceramics, adhesives, emulsion polymerization, inks, construction, welding rods, pencils, and joint fillers.

NaOH/Urea aqueous solution is a stable system for cellulose esterification. Hydroxyethyl cellulose is a nonionic, water-soluble polymer, dissolved readily in water to form a highly viscous formulation. In addition, it enhances pH value greater than 9.5, which is desired for the combined reaction of $CO_2$ capture and brine desalination. Based on the molecular structure of hydroxyethyl cellulose, the hydroxyl bond will be broken and attached to the carboxyl group to form a bicarbonate group, which, in turn, will attach to the cations in brine, such as Na, Ca, and Mg. The long structure of hydroxyethyl cellulose will also provide more surface area for ion exchange within a given reaction time. This hexagonal structure of hydroxyethyl cellulose will accommodate more $CO_2$ as compared to conventional alkaline sources. The method described herein provides a simple pollution-free and homogeneous aqueous solution system for synthesizing hydroxyethyl cellulose.

A method for making hydroxyethyl cellulose derived from biomass may include sieving 10 g of the biomass and transferring it to a Soxhlet flask, and removing extractives (including but not limited to resins and waxes) by Soxhlet extraction with benzene/ethanol (2:1) for 5 hours to produce an extractive-free biomass (as used herein, the term "extractive-free biomass" means the biomass remaining after extraction of materials that are soluble in benzene or ethanol). Five grams of the extractive-free biomass is then acid leached in a beaker with 0.1 M hydrochloric acid and heating to 100° C. under stirring for 2 hours to produce an insoluble cellulose/lignin-rich residue. The insoluble cellulose/lignin-rich residue is then separated by filtration, washed with deionized water, and air-dried. The dried cellulose/lignin-rich residue is then treated with 0.1 M sodium hydroxide under constant stirring at heating at 100° C. for 2 hours to produce a cellulose residue. The cellulose residue is separated by filtration, washed with 0.1 M sodium hydroxide, and air-dried. The dried cellulose residue is then bleached at 75° C. with 15, 20, and 10 wt. % acetic acid, hydrogen peroxide, and sulfuric acid, respectively. The bleached cellulose was then hydroxyethylated using 7.5 wt. % NaOH and 11 wt. % urea aqueous solution under mild conditions.

The use of hydroxyethyl cellulose in brine treatment (including, but not limited to, brine produced as reject brine during desalination) may include reacting hydroxyethyl cellulose, effluent gas ($CO_2$ and air), and high salinity brine at an elevated pH. The method may include using a mixture of 10% $CO_2$ and 90% air, and reacting the mixture at 20° C. at a pH above 10. The method may include reacting the mixture at a pH above 11. The result of reacting the aqueous mixture with the $CO_2$/air gas mixture may be a $CO_2$ uptake value up to 1.6 g $CO_2$/1 g hydroxyethyl cellulose. The result of treating high salinity brine with hydroxyethyl cellulose may be a treated brine with a reduced sodium concentration of up to 32%. The hydroxyethyl cellulose used to treat the high salinity brine may be hydroxyethyl cellulose produced using date palm biomass as described herein.

The treated brine resulting from reacting high salinity brine with hydroxyethyl cellulose may be used in enhanced oil recovery applications. The treated brine may have a low interfacial tension (as low as 4.95 mN/m), and thus may be particularly useful in forming water-oil emulsions and removing oil from within porous rocks. The treated brine may be used to supplement any known or yet to be developed method of enhanced oil recovery, which generally include injecting long chain polymers and surfactants into an oil reservoir in order to increase the percentage of oil contained in the reservoir that may be recovered.

The methods discussed herein provide a new technique for isolating cellulose (low concentration acid-base cellulose isolation) using a combination of 0.1 M NaOH and 0.1 M HCl, and this technique is found to be less expensive relative to the existing cellulose extraction techniques. Additionally, the new technique is more environmentally friendly than existing approaches. The methods disclosed herein may result in a yield greater than 74-76%, thus these methods offer a greater cellulose yield than the reported yield of the prior methods.

As described herein, hydroxyethyl cellulose is produced from a homogenous date palm cellulose using 7.5 wt % NaOH and 11 wt % urea aqueous solution under mild conditions. Hydroxyethyl cellulose is further utilized in the reaction of a gaseous mixture consisting of carbon dioxide and other gases and high saline water to increase the pH of the solution to 9.5 or greater. This results in the simultaneous capturing of carbon dioxide and reduction of salinity. In the initial step of this process, hydroxyethyl cellulose is mixed with a high saline water to form an aqueous feed stream, in which hydroxyethyl cellulose contributes to 1.0 to 2.0% by weight of the total aqueous feed stream. The gas stream may include about 0.03 to 0.15% carbon dioxide by volume and the aqueous feed stream includes 50-75 g/L sodium chloride.

As described herein, a new buffering agent extracted from biomass waste, namely, hydroxyethyl cellulose, was used instead of ammonia and calcium hydroxide, as in the Solvay and the modified Solvay processes, respectively. The processes described herein have many benefits, such as reduction in brine salinity and capturing carbon dioxide. Moreover, the methods discussed herein remove the ammonia recovery step of the Solvay process, which is a highly energy intensive step. Additionally, the methods discussed herein avoid the calcium hydroxide used in the modified Solvay process, whose manufacturing results in the production of $CO_2$ as effluent gas if pure CaO is used instead of waste material containing high content of CaO. Thus, the methods discussed herein are more economical and environmentally friendly than the previously used Solvay and modified Solvay processes. Further, adding hydroxyethyl cellulose will increase the density of the brine feed after mixing with certain molar ratios. This effect will increase the residence time distribution for the $CO_2$ gas inside the contactor system and accordingly will increase reaction efficiency. On the other hand, the treated brine may be used for enhancing oil recovery processes, such as those using the water flooding method. In this application, hydroxylethyl cellulose is used to reduce the interfacial tension of saline water, which ultimately leads to increased recovery of oil. Further, the use of hydroxylethyl cellulose synthesized from date palm waste biomass avoids the use of other, more expensive chemicals in these processes.

The following examples further illustrate the present embodiments.

Example 1

Characterization of Palm Biomass Composition

Palm biomass samples were provided by a local farm, collected from adult size (10-15 years old) date palm trees in Al-Ain, UAE (24122 N, 554441 E). The palm biomass was washed with deionized water to remove dust and any other form of physical impurities and later dried under the shade. Characterization of the palm biomass' composition, including Thermo Gravimetric Analysis (TGA), was performed to ascertain the fractions present in biomass. The TGA results are summarized in FIGS. 1A-1B.

Example 2

Preparation of Hydroxethyl Cellulose Using Palm Biomass

ACS grade solvents and all reagents were purchased from Sigma Adrich and used as delivered without further purification. Cellulose is physically and chemically surrounded by hemicellulose and lignin, all of which are linked together to form a matrix of lignocellulose. Therefore, pretreatment is needed prior to cellulose isolation. Ten grams of palm biomass was sieved through a predetermined size mesh, transferred to a weighed thimble, and then to a Soxhlet flask. The resins, waxes and other extractives were removed by Soxhlet extraction with benzene/ethanol (2:1) for 5 hours. Cellulose was then isolated from the pretreated/extractive free date palm waste (palm biomass) as follows. 5 g of the extractive free biomass sample was weighed into a 250 mL beaker, followed by acid leaching using 0.1 M hydrochloric acid (HCl) and heating at 100° C. under stirring for 2 hours. The mixture was then filtered, and the insoluble cellulose/lignin-rich residue was washed with 20 ml of deionized water and air-dried overnight. The cellulose/lignin-rich residue was then treated with 0.1 M Sodium Hydrochloride (NaOH) under constant stirring and heating at 100° C. for 2 hours. The mixture was filtered, and the cellulose-rich residue was further washed with 20 ml of 0.1 M NaOH. The cellulose residue was air-dried overnight prior to bleaching. For bleaching, the dried isolated cellulose sample was treated at 75° C. with 15, 20 and 10 wt %, acetic acid, hydrogen peroxide and sulfuric acid, respectively.

The amount of bleached sample (expressed as a percentage) was the amount of cellulose in the sample and was used for preparation of hydroxyethyl cellulose. Hydroxyethyl cellulose was prepared from the bleached cellulose using 7.5 wt % NaOH and 11 wt % urea aqueous solution under mild conditions.

Example 3

Use of Hydroxyethyl Cellulose to Treat Brine

A commercially available hydroxyethyl cellulose was mixed based on different weight ratios with high salinity brine at different pH levels. The pH level of the high salinity brine/hydroxyethyl cellulose mixture was adjusted by adding different weight percentages of hydroxyethyl cellulose to 500 ml brine samples (See Table 1). Specifically, weight percentages of hydroxyethyl cellulose between 0.25 wt. % and 2 wt. % were mixed with 500 ml samples of brine having a specific sodium choride concentration (23,710 ppm) for 60 minutes to adjust the pH of the resulting aqueous mixture to between 8.8 and 11.8. This mixture was then fed into a bubble column reactor, and then an effluent gas mixture (10% $CO_2$ and 90% air by volume) was injected into a bubble column reactor at a flow rate of 700 ml/min., where it reacted with one of the aqueous mixtures. This experiment was conducted in semi-batchmode (batch for the aqueous mixture and continuous for the gas stream) for 120 minutes.

In order to determine the percentage of $CO_2$ present in the effluent gas before and after the reaction, the effluent gas from the top of the reactor system was passed through a moisture trap and a $CO_2$ gas analyzer (Model 600 series, Non-Dispersive Infrared NDIR analyzers, USA). The $CO_2$ capture percentage with time was recorded and the $CO_2$ capture efficiency was calculated based upon Equation 1.

$$CO_2 \text{ capture efficiency} = \frac{CO_2 \text{ captured (mol)}}{CO_2 \text{ feed (mol)}} \times 100\% \quad (1)$$

The $CO_2$ uptake value was also used to indicate the mass of $CO_2$ sequestered/mass of hydroxyethyl cellulose (HEC) and calculated according to Equation 2.

$$CO_2 \text{ uptake} = \frac{\text{flow rate} \times \text{flow time} \times CO_2(\text{vol. \%}) \times CO_2(\text{mol. wt.})}{CO_2(\text{mol. vol.}) \times HEC(\text{mass})} \quad (2)$$

In order to determine the starting and final sodium chloride concentration, the feed and treated brine sodium were diluted and measured with the aid of three reference values of known sodium concentration. The results were validated with an average error within ±10 to 100 ppm. Sodium concentration was analyzed using inductively coupled plasma spectrometry (Varian 710-ES ICP otical emission spectrometer, USA). The percentage reduction in sodium was calculated according to Equation 3, where $X_i$=the initial sodium concentration in the feed brine (ppm) and $X_f$=the final sodium concentration in the treated brine (ppm).

$$\text{Sodium Reduction \%} = \frac{X_i - X_f}{X_i} \times 100\% \quad (3)$$

Figure 3:
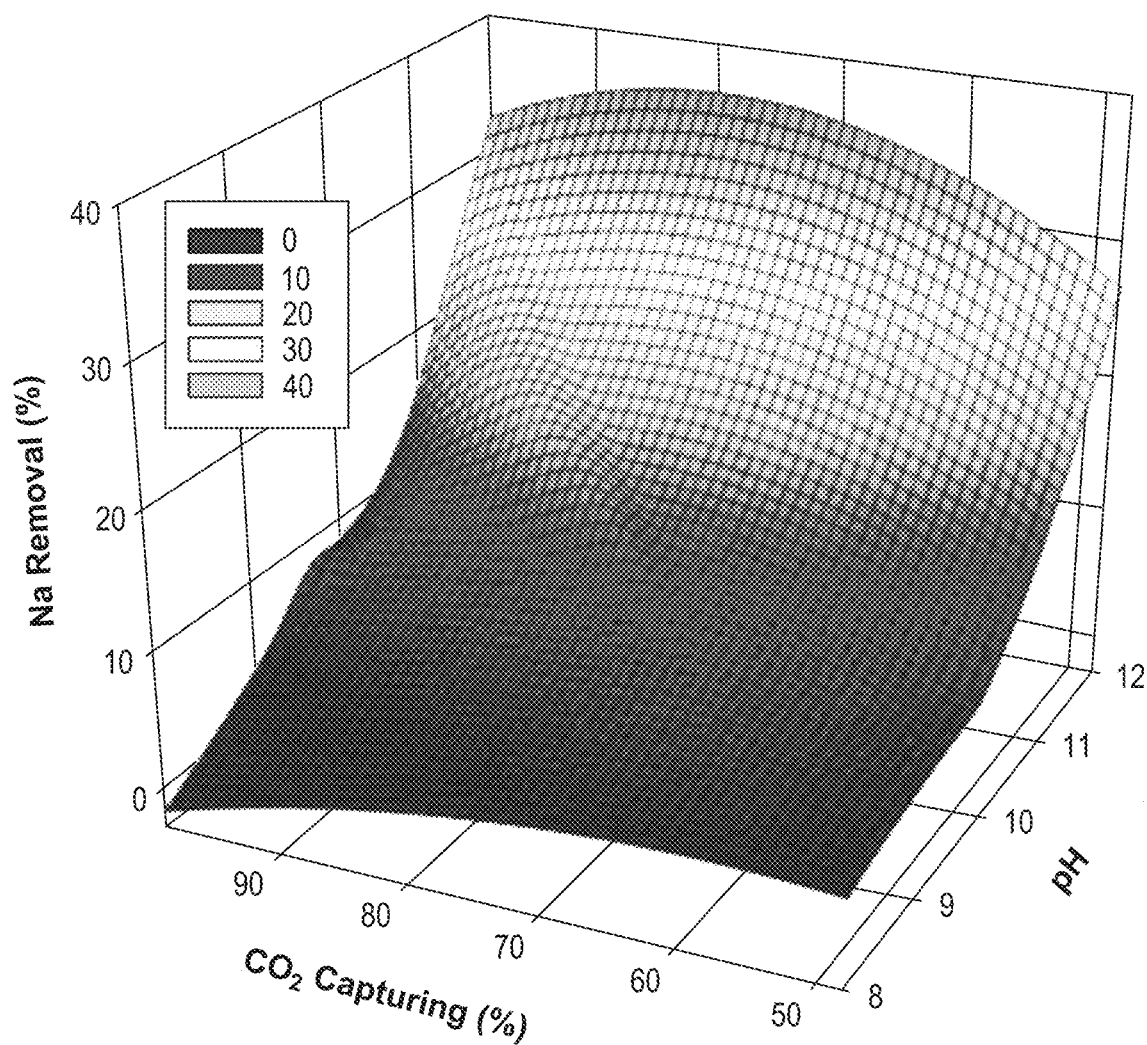
FIG. 3 is a 3-D plot of $CO_2$ capture percentage and sodium reduction as a function of the pH level of the brine and hydroxyethyl cellulose mixture.

The results of these experiments are summarized in Table 1. The reaction demonstrated high $CO_2$ capture efficiency at optimum conditions of temperature (around 20° C.) and pH level more than 11.0, and salinity reduction was shown. The peak $CO_2$ capturing efficiency resulted in a $CO_2$ uptake of around 1.6 g $CO_2$ per gram of hydroxyethyl cellulose. The long chain structure of hydroxyethyl cellulose allows for a large number of hydroxyl groups. This structural feature of hydroxyethyl cellulose increases the pH above 10.0, ultimately increasing the rate of the $CO_2$ dissociation reaction by more than 95%. This leads to a reduction in sodium concentration of up to 32%, as shown in Table 1 and FIG. 3.

TABLE 1

Resulting pH, CO2 capture, and sodium reduction

| HEC wt. % | Initial pH aq. mix | Final pH aq. mix | Initial $CO_2$ Vol. % | Final $CO_2$ Vol. % | Initial [$Na^+$] ppm | Final [$Na^+$] ppm | $CO_2$ capture eff. % | $Na^+$ reduction % |
|---|---|---|---|---|---|---|---|---|
| 2 | 11.8 | 8.8 | 10 | 0.2 | 23,710 | 16,027 | 99.2 | 32.4 |
| 1.5 | 11.01 | 8.1 | 10 | 0.9 | 23,710 | 19,537 | 97.6 | 17.6 |
| 1 | 10.2 | 7.9 | 10 | 1.6 | 23,710 | 21,173 | 92.4 | 10.7 |
| 0.5 | 9.2 | 7.8 | 10 | 8.1 | 23,710 | 22,097 | 59.4 | 6.8 |
| 0.25 | 8.8 | 7.8 | 10 | 9.8 | 23,710 | 22,880 | 48.1 | 3.5 |

Figure 4:
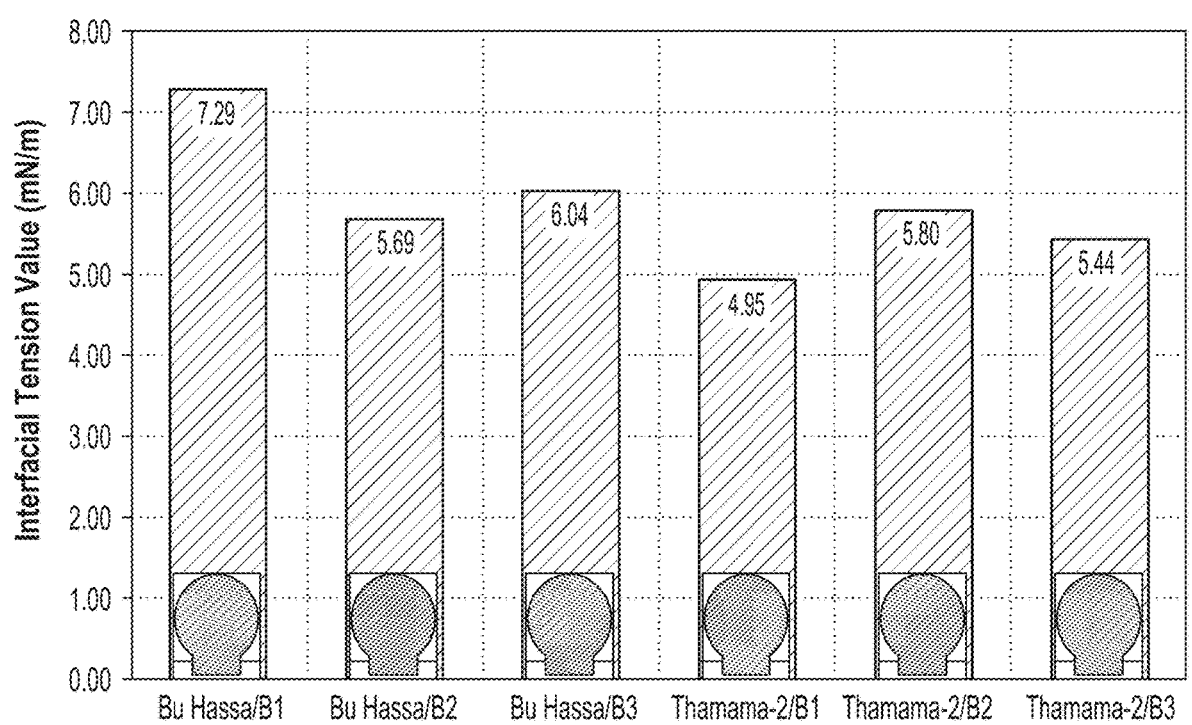
FIG. 4 is a chart showing interfacial tension of crude oil samples as a function of treatment with brine of different pH.

Treated brine samples after physical separation from the solid products were subjected to Tracker Tensiometer analysis. The analysis was performed for different crude oil samples with different pH levels to measure variations in interfacial tension over time. This instrument was also used to measure the contact angle between liquids and solids. The liquid drops are oscillated to find out the complex elastic modulus, including viscous and elastic components. The results are illustrated in FIG. 4, which demonstrates evidence that the use of hydroxyethyl cellulose to treat brine reduced the interfacial tension value to 4.95 mN/m. This low value of interfacial tension indicates the high potential of using the treated brine in enhancing oil recovery from reservoir rocks. The low interfacial tension indicates an increased ability to form water-oil emulsions, which assist in driving oil in a more spontaneous way out from rock pores.

It is to be understood that the system and method for doing something is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of making hydroxyethyl cellulose derived from biomass, comprising the steps of:
   providing a biomass, wherein the biomass is selected from the group consisting of plant waste biomass and date palm waste;
   extracting the biomass to produce an extractive-free biomass;
   acid leaching the extractive-free biomass to obtain a cellulose/lignin-rich residue;
   alkali treating the cellulose/lignin-rich residue with sodium hydroxide to produce a cellulose-rich residue;
   bleaching the cellulose-rich residue to obtain bleached cellulose, wherein the bleaching at 75° C. with 15 wt. % acetic acid, 20 wt. % hydrogen peroxide, and 10 wt. % sulfuric acid; and
   hydroxyethylating the bleached cellulose using 7.5 wt. % sodium hydroxide and 11 wt. % aqueous urea to produce alkaline hydroxyethyl cellulose.

2. The method of making hydroxyethyl cellulose of claim 1, wherein said step of extracting the biomass comprises extracting the biomass with benzene/ethanol (2:1) solvent in a Soxhlet extractor for at least 5 hours.

3. The method of making hydroxyethyl cellulose of claim 1, wherein said step of acid leaching the extractive-free biomass comprises acid leaching the extractive free biomass with 0.1 M hydrochloric acid at 100° C. for at least 2 hours.

4. The method of making hydroxyethyl cellulose of claim 1, wherein said step of alkali treating the cellulose/lignin-rich residue comprises alkali treating cellulose/lignin-rich residue with 0.1 M sodium hydroxide of 100° C. for at least 2 hours.

\* \* \* \* \*